United States Patent [19]
Evancic et al.

[11] 3,885,488
[45] May 27, 1975

[54] TAPERED CAST TOOTH INSERT FOR SAW

[75] Inventors: Ernest A. Evancic, Fitchburg, Mass.; Kenneth E. Davis, Winter Park, Fla.; Joseph T. Blucher, Waltham, Mass.

[73] Assignee: Wallace Murray Corporation, Fitchburg, Mass.

[22] Filed: Jan. 7, 1974

[21] Appl. No.: 431,231

[52] U.S. Cl. .................. 83/835; 83/841; 83/592; 56/295
[51] Int. Cl. .................. B27b 33/12; A01d 55/18
[58] Field of Search ............ 83/835, 839, 840, 841, 83/592; 56/14.3, 13.9, 294, 295

[56] References Cited
UNITED STATES PATENTS

| 1,141,063 | 5/1915 | Kendall | 83/841 |
| 1,736,560 | 11/1929 | Walker | 83/835 |
| 2,391,719 | 12/1945 | Llewellyn | 83/356.3 |
| 3,104,579 | 9/1963 | Blankenship et al. | 83/592 X |
| 3,507,180 | 4/1970 | Greenberg | 83/592 |
| 3,799,025 | 3/1974 | Tsunoda | 83/835 |

Primary Examiner—Willie G. Abercrombie

[57] ABSTRACT

A tooth insert for saw blades is made of a single one-piece solid metal casting having a shank portion of uniform thickness and a symmetrical integral tip portion gradually diminishing in thickness towards the tip end of the insert in order to reduce correspondingly the width of the cut made by the cutting edge thereby reducing the amount of loss to the material being cut.

2 Claims, 5 Drawing Figures

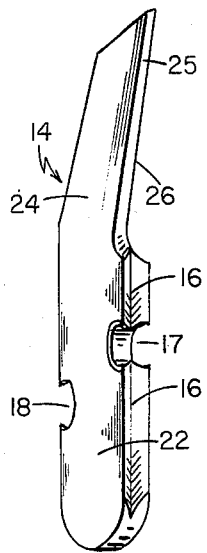
FIG. 1
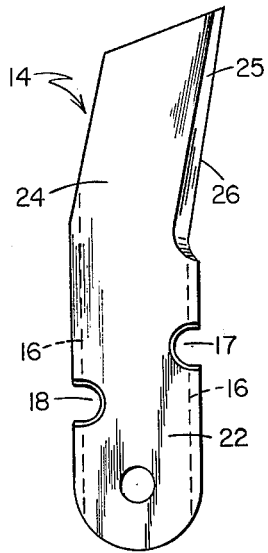
FIG. 3
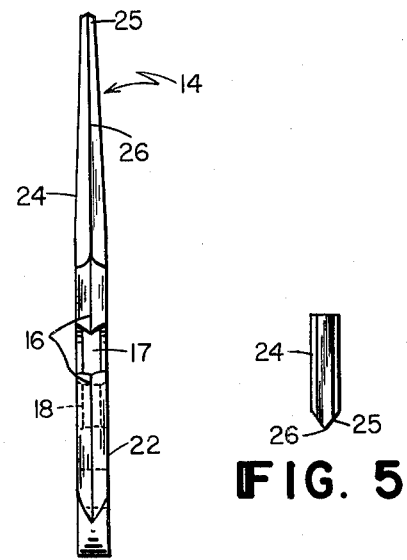
FIG. 4 FIG. 5
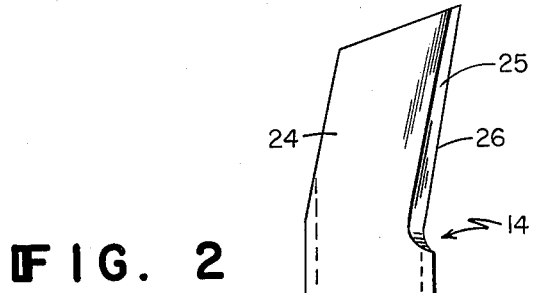
FIG. 2
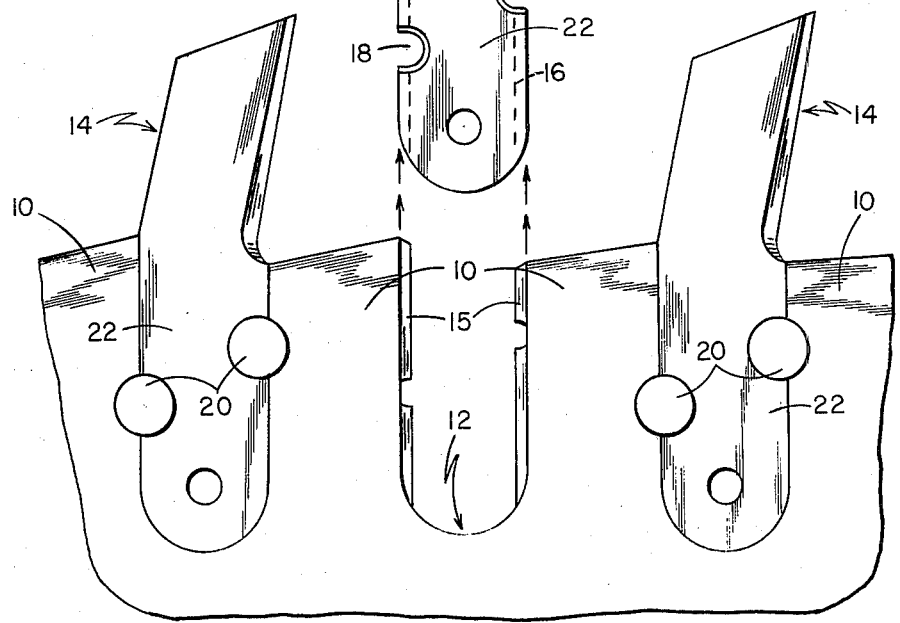

TAPERED CAST TOOTH INSERT FOR SAW

This invention relates to tooth inserts for cut-off saws and has for an object the production of an insert of novel form and structure which serves to reduce the amount of stock damaged by the tooth during each cut.

Sugar cane sawing operations are always subject to losses due to the inevitable damage of the stock being cut to a width equal to the kerf, i.e., the width of the saw cut.

The thickness of the saw is dictated by the necessity of having sufficient strength to withstand in both the tooth connection and the overall saw, bending and breakage forces encountered during operation. It has now been observed that with a saw body and tooth insert shank portions of sufficient equal thickness to stand up under the stresses of operation, great savings in loss of stock can be secured by diminishing the thickness of the blade outwardly. Such shaping is best accomplished by casting the insert so that the symmetrical taper is imparted during the casting operation.

The invention thus takes advantage of the fact that some cast metal alloys have sufficient strength in certain thicknesses for saw blade usage provided that the cast product is symmetrically designed which compensates for the gradually decreasing thickness of the insert blade where it extends beyond the saw body in a symmetrical taper, which symmetrical taper is in turn made economically feasible only by virtue of the fact that the insert is cast rather than made from rolled stock which would have to be ground to impart the symmetrical taper.

The invention can best be described by reference to the accompanying drawings wherein:

FIG. 1 is a perspective view of one of the teeth of the invention;

FIG. 2 is a side-elevational partially exploded view of a portion of a saw plate bearing inserted teeth as shown in FIG. 1;

FIG. 3 is a side-elevational view of a tooth insert of the invention;

FIG. 4 is a front elevational view of the tooth insert;

FIG. 5 is a tip end view of the tooth.

As shown in FIG. 1, a saw plate 10 has a series of slots, one of which is indicated at 12 in FIG. 1 for the reception of tooth inserts 14, the edges of the slots being bevelled to act as tongues 15 which engage matching grooves 16 on the inserts. Apertures 17, 18 are provided on the inserts for insertion of rivets 20 for holding the inserted teeth in place.

The flat shank portion 22 of each tooth is of a uniform thickness equal to that of the saw plate 10, but merges into a blade portion 24 which gradually tapers symmetrically in thickness, as shown in FIG. 4, towards the tip end of the insert.

The front edge of the insert has a 60° symmetrical double bevel at 25 forming a cutting edge 26 extending along the front of the blade portion of the insert.

In accordance with the invention, the inserts are solid cast pieces and can be, for example, Cobalt alloy No. 6, or other metals such as tool steels that can be successfully cast by an investment casting process to provide the symmetrical taper on the blade portion of the otherwise flat insert.

In one embodiment, the thickness of the shank portion 22 of the blade was 0.183 inches and the symmetrical taper brought the thickness down to 0.095 at the tip end of the blade. The thickness was thus reduced almost in half over the length of the tip portion.

When used in cross-cutting materials, such for example as sugar cane, much of the stock is presented to the outer end of the blades and, therefore, is not cut to a saw cut width as great as the thickness of the shank portion of the insert, but rather is cut only to a stock removal equal to the width of the thinner symmetrical portion of the blade nearer its tip end. With the millions of cuts made as in usage for cutting sugar cane, a substantial savings is involved over that which would occur were the blade of equal thickness throughout. However, it becomes economically feasible to thus shape the blade portion of the insert mainly because it is done automatically in the casting process and requires no special grinding as would be required should the entire tooth insert be made from steel plate.

What is claimed is:

1. A tooth insert for a saw, said insert having a solid flat cast metal shank portion having substantially uniform thickness and a blade portion cast in one piece with said shank portion, said blade portion having a maximum thickness no greater than the thickness of said shank portion and decreasing in thickness symmetrically from the shank portion to the tip end of the insert and a sharpened cutting edge formed by a symmetrical double bevel extending along the front edge of said blade portion.

2. A tooth insert as claimed in claim 1 wherein the reduction in thickness is almost 50 percent.

* * * * *